United States Patent [19]

Komatsu et al.

[11] Patent Number: 5,144,214

[45] Date of Patent: Sep. 1, 1992

[54] NUMERICAL CONTROL SYSTEM FOR MOVING WORK OR CUTTER IN SYNCHRONISM WITH THE ROTATION OF A SPINDLE

[75] Inventors: Toshiteru Komatsu; Kunio Miura, both of Ooguchi, Japan

[73] Assignee: Kabushiki Kaisha Okuma Tekkosho, Aichi, Japan

[21] Appl. No.: 526,906

[22] Filed: May 22, 1990

[30] Foreign Application Priority Data

May 24, 1989 [JP] Japan ................... 1-130989

[51] Int. Cl.⁵ .............................. G05B 19/18
[52] U.S. Cl. ..................... 318/600; 318/569
[58] Field of Search ............... 318/560, 567, 569, 570, 318/571, 600, 602, 603, 654, 661

[56] References Cited

U.S. PATENT DOCUMENTS

| | | | |
|---|---|---|---|
| 4,641,069 | 2/1987 | Fujioka et al. | 318/625 |
| 4,983,899 | 1/1991 | Komatsu et al. | 318/571 |
| 5,019,763 | 5/1991 | Komatsu | 318/571 |

Primary Examiner—Bentsu Ro
Attorney, Agent, or Firm—Wenderoth, Lind & Ponack

[57] ABSTRACT

In a numerical control system which controls the rotational angle of a spindle in a numerically controlled machine and tool in synchronism with the position of a feed axis based on a data table storing information for positional commands for the feed axis in correspondence with the rotational angle of the spindle, a universal purpose turning operation is effected at a higher efficiency by generating a marker pulse when a value set by counting the pulses in A- and B-phases from a spindle pulse generator has reached a pre-set value, and by controlling synchronization during synchronized operation, based on the marker pulse instead of the marker phase pulse from the spindle pulse generator.

5 Claims, 9 Drawing Sheets

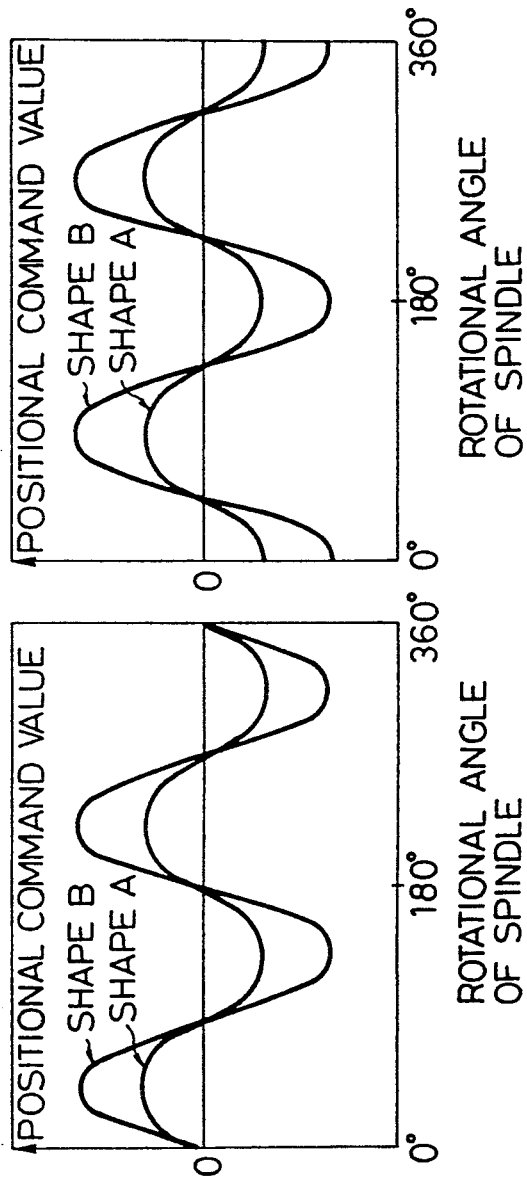
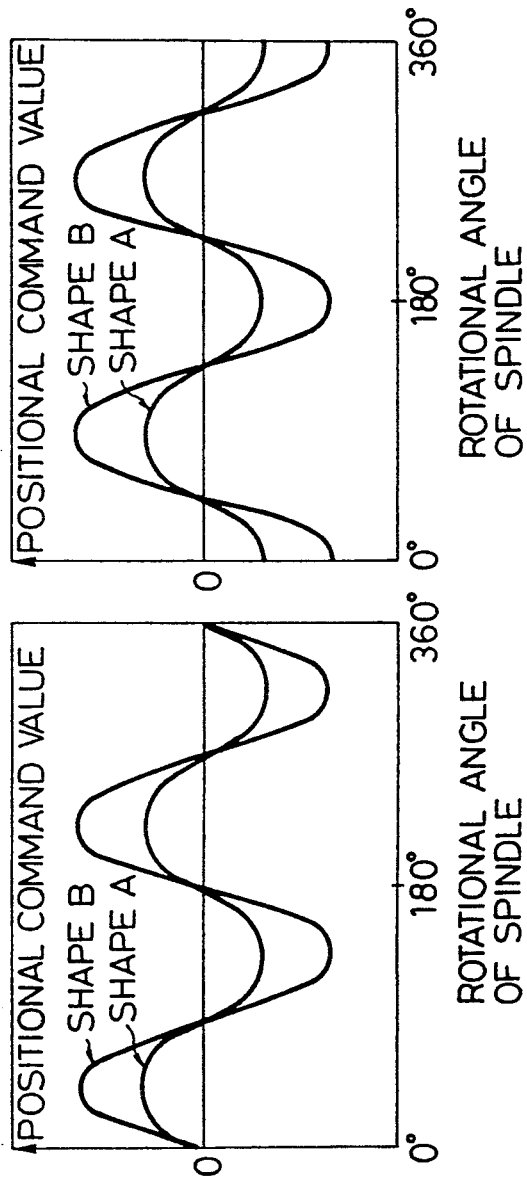

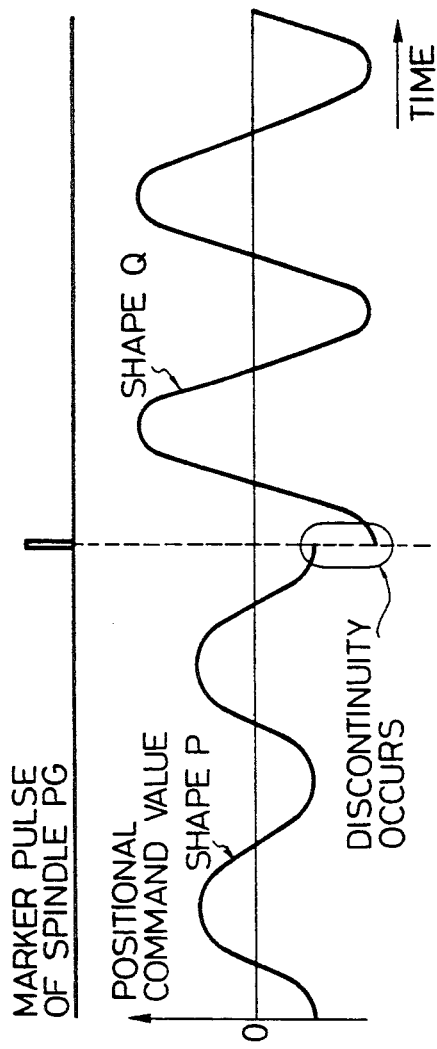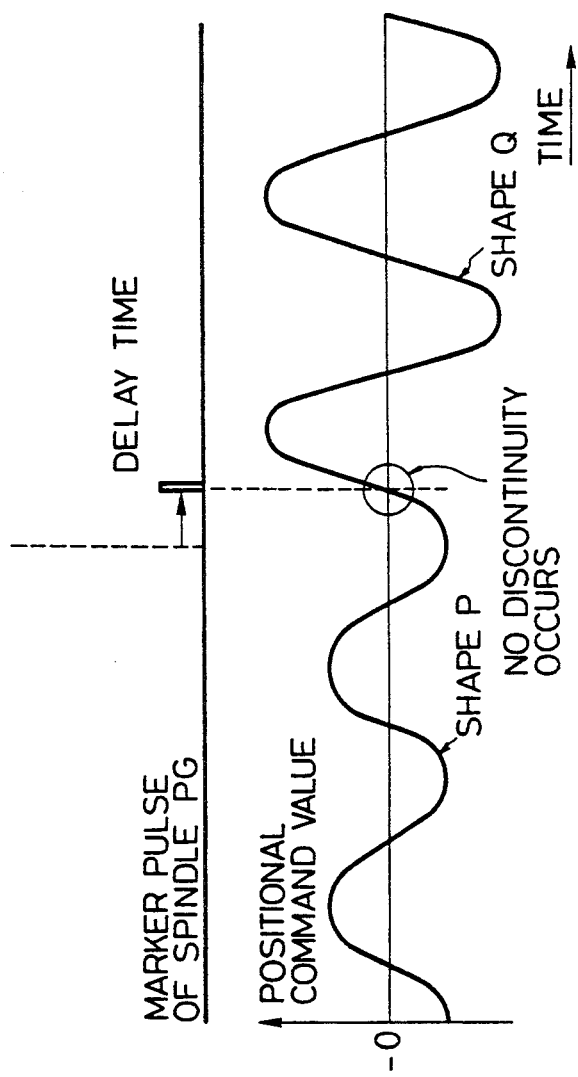

NUMERICAL CONTROL SYSTEM FOR MOVING WORK OR CUTTER IN SYNCHRONISM WITH THE ROTATION OF A SPINDLE

BACKGROUND OF THE INVENTION

The present invention relates to a numerical control system which performs turning operations by moving a cutter or a work in synchronism with the rotation of a spindle, and more particularly to a numerical control system for turning operations such as tapping, polygonal machining, cam turning and so on.

In the prior art numerical control apparatus which moves a cutter or a work in synchronism with the rotation of a spindle, position command values to be given to a axis which moves the work or the cutter are arithmetically calculated and outputted in correspondence with a detected rotational angle of the spindle without changing the phase position of the marker pulses from a spindle pulse generator (hereinafter referred to as "a spindle PG") against A- and B-phase pulses. More specifically, referring to FIG. 1, the spindle PG 8 is fixed on a spindle for detecting the rotational angle thereof to output various signals in the form of pulses comprising generally A- and B-phases and the marker phase. Since the A- and B-phases are defined in respect of the phase relationship, the rotational direction may generally be determined simply by detecting the phase relationship between the two phases. The signals in the marker phase are the signals which enable detection of the rotational angle of 360 degree or less by outputting one pulse for one rotation.

A numerical control system 100 is adapted to output the rotational angle value of the spindle from a rotational angle detector 31, and to output axis command values in correspondence with the detected values from a interpolator 32. A case where a starting point for tapping is to be changed is assumed; since the rotational angle value is the value counted from the rotational angle of the marker pulse, if the point is to be moved by 10 degrees from the value or the reference, then value of the angle is to be subtracted from the above rotational angle value after having matched the units of the both apparatus. If the difference is positive or zero, the positional command value of the axis in correspondence with the subtracted value is to be arithmetically calculated and then outputted.

Such operation has been generally performed in the numerical control causing no significant problems as functions of positional command values can be generated only in the period of about 1-10 msec, and the positional loop gain of the feed axis remains at about 20-80 sec$^{-1}$ at the current technical level. However, the demand for an extremely specialized turning operation at a high speed and at a high precision has increased in recent years. Therefore, for such a highly specialized purpose, it is necessary to use a numerical control system which is exclusively adapted for that purpose with specialized functions.

Such a specialized numerical control system has been proposed, for example, by Japanese Patent Application No. 190173/1988 entitled "Numerical control system with a detection function of follow-up errors". In that system, control is performed as follows when the rotational angle of the spindle of a numerically controlled machine is synchronously controlled with the position of the feed axis. More specifically, the apparatus first reads out a positional command value for the feed axis corresponding to the actual rotational degree detection value out of a data table which is stored in advance in correspondence with the rotational angle of the spindle. The actual positional detection value of the feed axis is subtracted from the read-out command value to obtain the positional deviation of the feed axis. Then, a correction value corresponding to the actual rotation angle detection value of the spindle is read out from the data table of the correction values of the feed axis which is stored in advance in correspondence with the rotational angle of the spindle, and the read-out value is added to the positional deviation. By synchronously controlling the apparatus based on thus obtained value, a special turning operation becomes possible.

In the above mentioned numerical control system, since the data tables have been prepared in advance, and the apparatus does not require interpolation during the numerical control, a period as short as about 0.1 msec can be realized. The higher stiffness of the feed axis achieved in recent years has improved the positional loop gain to approximately 100-300 sec$^{-1}$. For instance, when the rotational speed of the spindle is 3000 RPM, and a work is to be cam-turning in an elliptical shape, the period of one rotation of the spindle is 20 msec, and there are 4 positional command values of the numerical control system for one rotation of the spindle if the interpolation period is 5 msec. A precisely elliptical shape, therefore, cannot be machined. However, the new numerical control system having the aforementioned special turning operation can issue 200 commands because the period is at least 0.1 msec.

The above mentioned numerical control system is still not quite satisfactory because it is too time consuming as the data tables must be re-prepared when the rotational angle position of a work with respect to the spindle chuck is to be changed for synchronized control of the rotational angle of the spindle and the position of the feed axis. Especially, it consumes too much time because one needs to re-prepare all the data tables corresponding to plural rotations instead of the data table for one rotation of the spindle. When a work has a shape equivalent to one rotation of the spindle and when the starting point for the designated shape has to be changed continuously by the position parallel to the direction of the rotational central axis of the spindle; in other words, when a work shaped as shown in FIG. 6 is to be lathed, the data tables should be re-prepared within one rotation of the spindle or functions should be generated in real time while the work is being machined. In short, it was quite difficult to increase the number of spindle rotations.

As shown in FIGS. 2A-2B when a work should be continuously shaped into at least two types of forms having the same phase angles but different amplitudes, and if the rotational angle position of the work in respect of the spindle chuck is varied by simply shifting the data table thereof, a considerable gap is inevitably generated in the positional command value which shifts the data table with the marker pulses generated from the spindle. The gap poses a serious problem in control because it requires a higher speed and acceleration of a feed axis.

SUMMARY OF THE INVENTION

The present invention was contrived to eliminate such problems encountered in the prior art, and aims to provide a numerical control system of a universal purpose type which can easily perform turning operations with a higher efficiency.

According to one aspect of the present invention, for achieving the objects described above, there is provided a numerical control system of the type which includes data tables storing positional command information of a feed axis in correspondence with a rotational angle of a spindle of a numerically controlled machine and tool, and which controls the rotational angle of said spindle in synchronism with the position of said feed axis based on the pulses of the marker phase and of A- and B-phases from a spindle pulse generator, the numerical control system being characterized by the structure comprising a memory means for set values which can set an arbitrary value, a counting means which counts pulses in the A- and B-phases from said spindle pulse generator and clears the counted value with the pulse in the marker phase, a marker pulse generating means which generates marker pulses when the counted values by said counting means has reached the value set at said memory means, and a switching means which switches the marker phase pulses from said spindle pulse generator to the marker phase pulse from said marker pulse generating means at the time of synchronized operation based on the marker pulse from said marker pulse generating means and the content of said data tables.

The nature, principle and utility of the invention will become more apparent from the following detailed description when read in conjunction with the accompanying drawings.

BRIEF DESCRIPTION OF THE DRAWINGS

In the accompanying drawings:

FIGS. 2A-2B are graphs to show the case where two types of shapes having the same phase angles and different amplitudes are formed continuously;

FIGS. 9A and 9B are graphs to describe the present invention.

DESCRIPTION OF THE PREFERRED EMBODIMENT

The present invention will now be described in more detail by referring to preferred embodiments shown in the attached drawings.

Figure 1:
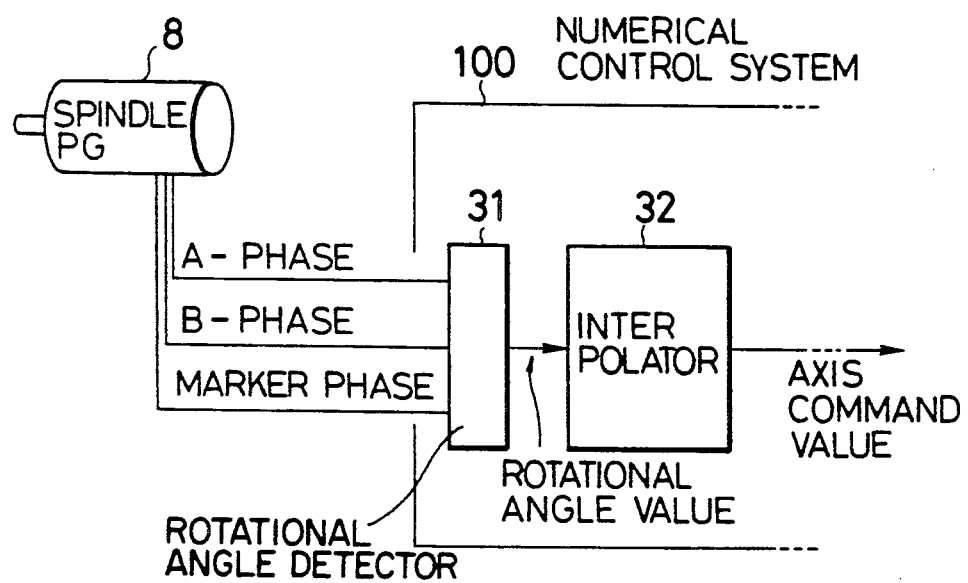
FIG. 1 is a block diagram to show a prior art numerical control system.
Figure 3:
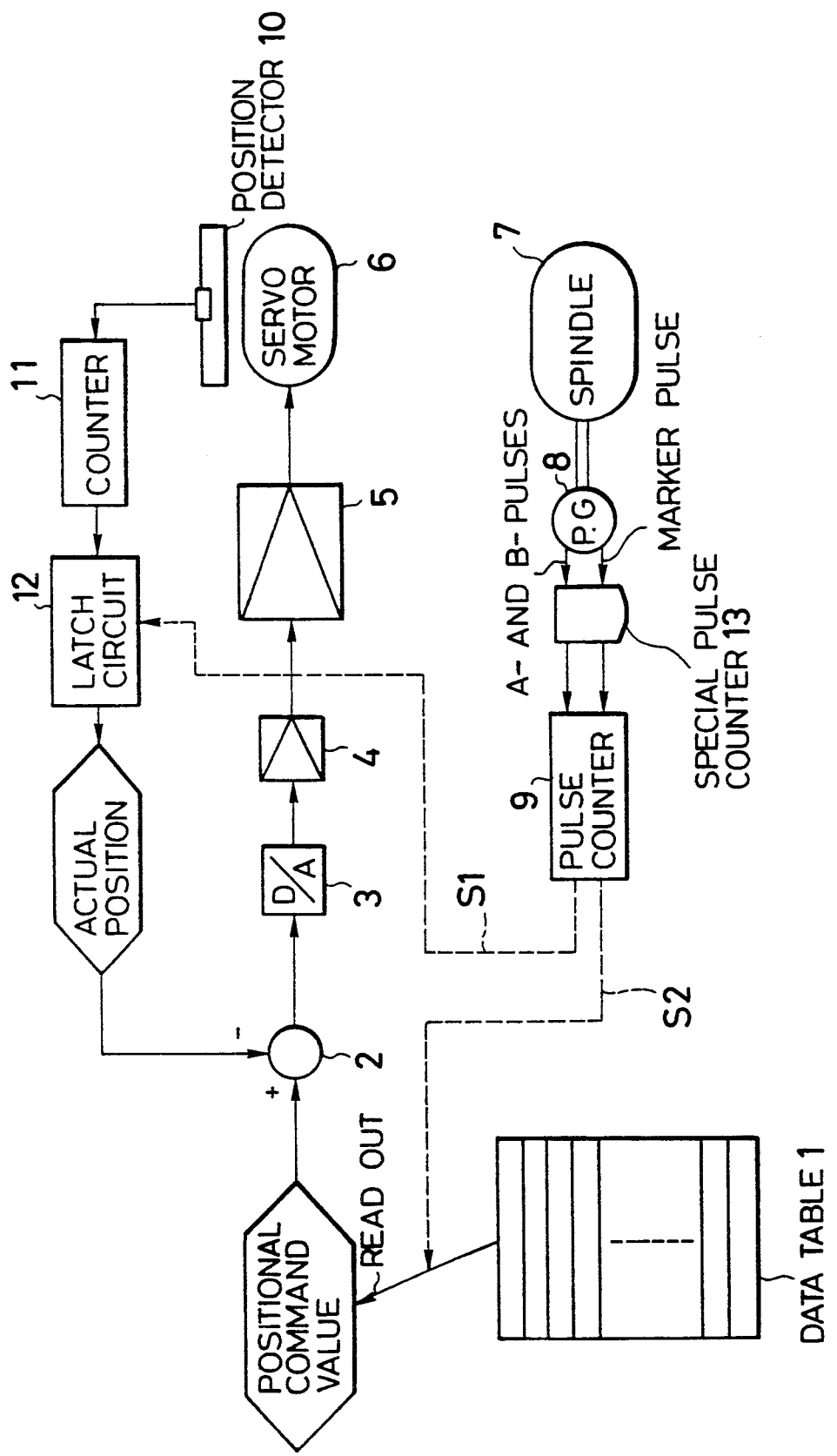
FIG. 3 is a block diagram to show an embodiment of the present invention numerical control system.

In a numerical control system shown in FIG. 3 which can synchronously control the rotational angle of a spindle of a numerically controlled lathe or the like with the position of a feed axis thereof, a spindle PG 8 detects a rotational angle of a spindle 7 and generates a marker pulse; a special pulse counter 13 generates a marker pulse at a position arbitrarily set with respect to the above noted marker pulse; a pulse counter 9 counts pulses in A- and B-phases from the reference point which is either the marker pulse from the special pulse counter 13 or the marker pulse directly from the spindle PG 8. A latch circuit 12 reads a actual position of the feed axis which is driven by a servo motor 6 based on the actual position reading signal S1 from the pulse counter 9 via a position detector 10 and a counter 11. The apparatus includes a data table 1 for position command values which stores the positional command values corresponding to pulses equivalent to one rotation of the spindle functionally generated by the spindle PG 8 by generating on off-line the functions thereof. A subtracter 2 subtracts a positional command value read out from the data table 1 from the current position from the latch circuit 12 by using the table address signal S2 from the pulse counter 9 as a control timing to obtain a positional deviation value. Furthermore, the subtracter 2 sends the positional deviation value to a servo amplifier 5 via a digital/analog (D/A) converter 3 and an analog amplifier 4 so as to synchronize the rotational angle of the spindle with the position of the feed axis.

Figure 4:
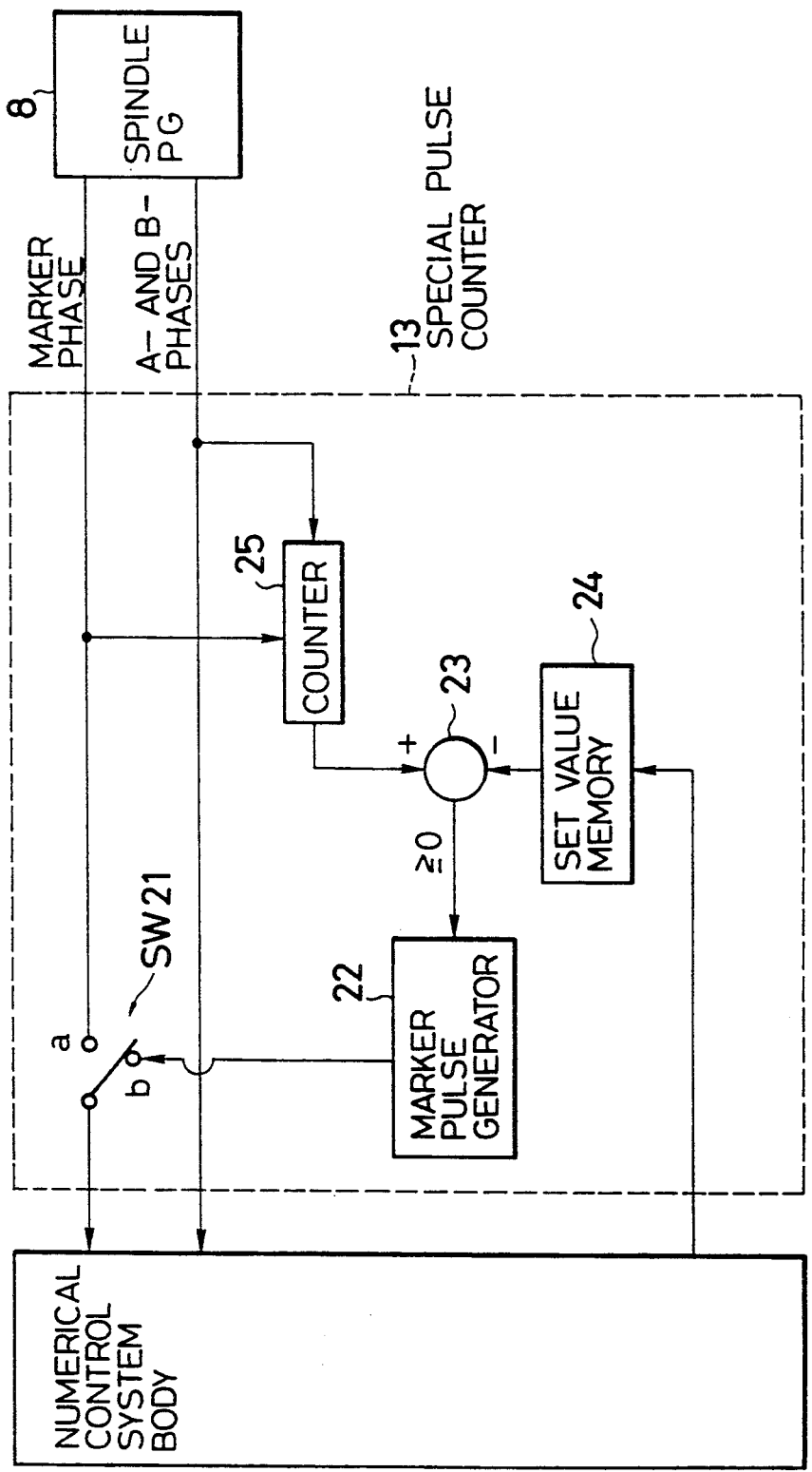
FIG. 4 is a view to show a special pulse counter in structure.

Referring now to FIG. 4, a special pulse counter 13 is described in detail below. The special pulse counter 13 comprises a switch (SW) 21, a marker pulse generator 22, a subtracter 23, a set value memory 24 and a counter 25. During the normal operation, the switch 21 is connected to a contact a while during the synchronized operation, it is connected to a contact b. During synchronized operation, a set value for the marker pulse generating position is stored in a set value memory 24. The set value may be re-set to an arbitrary value. A marker pulse is outputted from the marker pulse generator 22 when the output from the subtracter 23 satisfies $(c-k) \geq 0$ wherein the set value is denoted as c, and the value stored in the set value memory as k.

Figure 5:
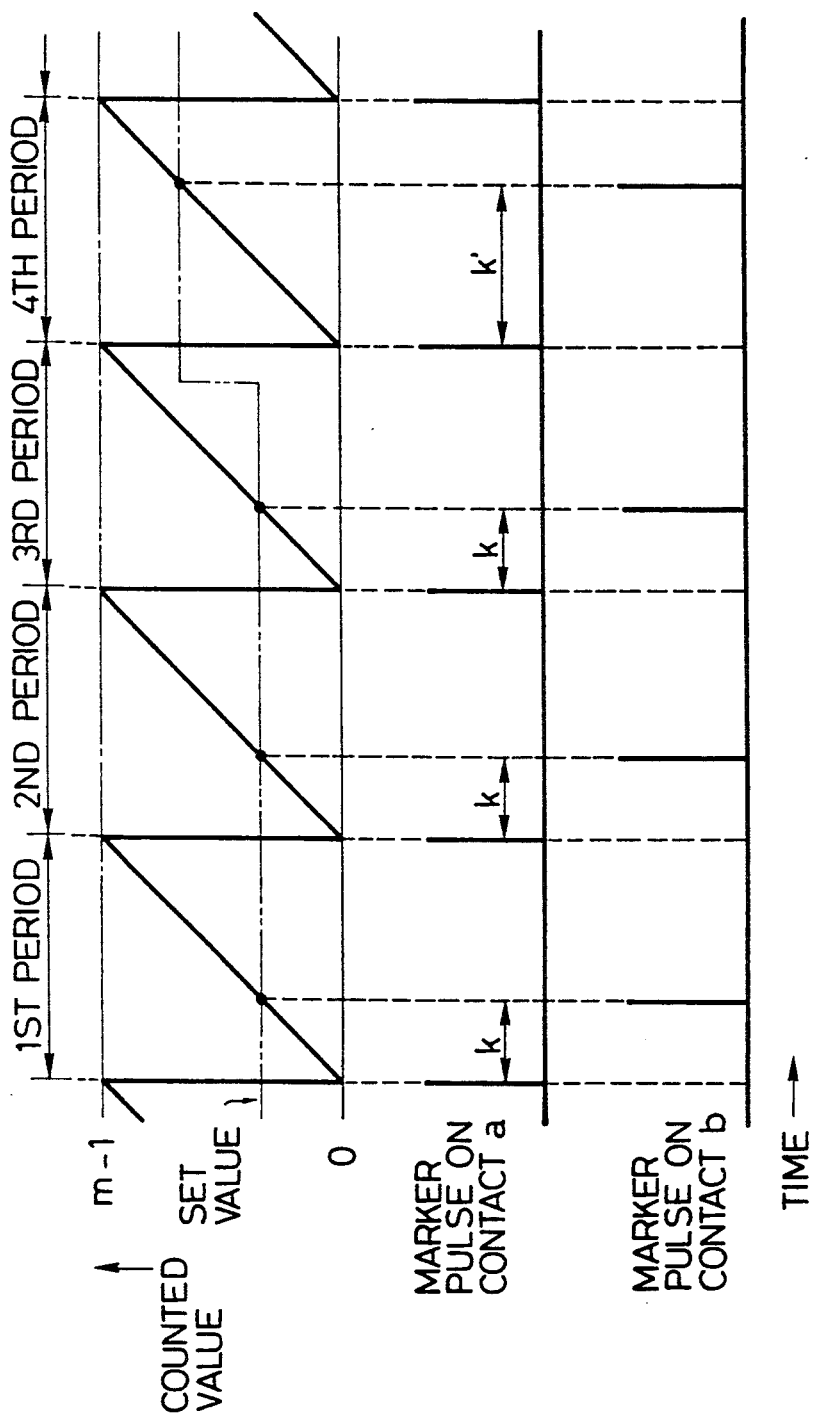
FIGS. 5A to 5C are views to explain the function of the special pulse counter.

An example of the operation will now be described by referring to FIGS. 5A to 5B. FIGS. 5A to 5B show the relationship among the values counted by the counter 25, the marker pulse generating position set value stored in the set value memory 24 and the marker pulse to be inputted in the apparatus body. FIG. 5A shows the values counted by the counter 25, which the counted values increase chronologically and are cleared with a marker pulse outputted from the spindle PG 8. FIG. 5B shows a marker pulse inputted in the apparatus body when the switch 21 is connected with the contact a. FIG. 5C shows a marker pulse inputted at the system body when the switch 21 is connected to the contact b. If the switch 21 is connected with the contact b, the marker pulse is outputted when the marker pulse generating position set value becomes equal (or delayed by k) to the counted value shown in FIG. 5A. By changing the marker pulse generating position set value, the marker pulses can be generated at an arbitrary timing (for instance, delayed by k') as shown in the 4th period in FIG. 5A.

In the system as above structured, when the marker pulse is generated from the spindle PG 8, the system starts reading out the positional command values from the starting point of the data table 1 for the positional command values. Therefore, by varying the phase relationship of the marker pulse as against the A- and B-phases by a special pulse counter 13 during the operation, the phase of the shape for machining the work against the rotational angle of the spindle may be changed.

Figure 6:
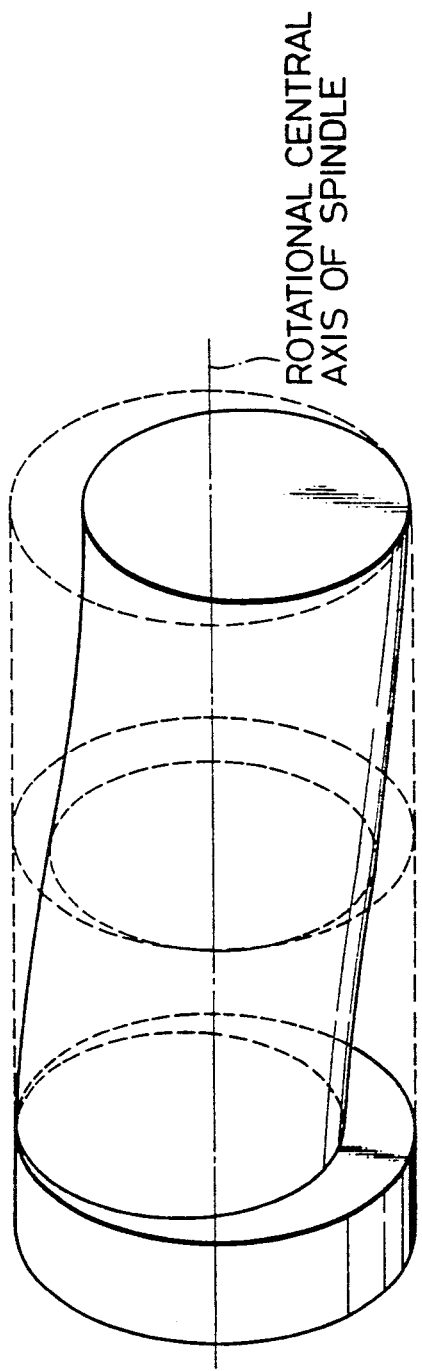
FIG. 6 is a view to show effectively machined shapes by the present invention apparatus.

As the data table 1 stores N number of the data when the special pulse counter 13 is not in operation, the $(N+\alpha)$-numbered data are read out by the above operation. The α-numbered data is stored in advance from the starting point of the data table 1 so as to avoid reading out the data table 1 in the portion where no data exist. This facilitates machining works into shapes such as shown in FIG. 6 even if the rotational speed of the spindle is very high. More particularly, if the spindle operates at 3000 RPM and a work is to be machined into the shape shown in FIG. 6 by re-writing the data table 1, all the data should be re-written at least within 20 msec. However, if there are 1024 command values per one revolution of the spindle, data should be re-written at least within about 20 μsec. Numerical control system generally performs the data processing or the axis control in multi-task processing, and re-writing at the speed as high as or higher than above is not be possible. However, this invention apparatus enables such processing.

Figure 7:
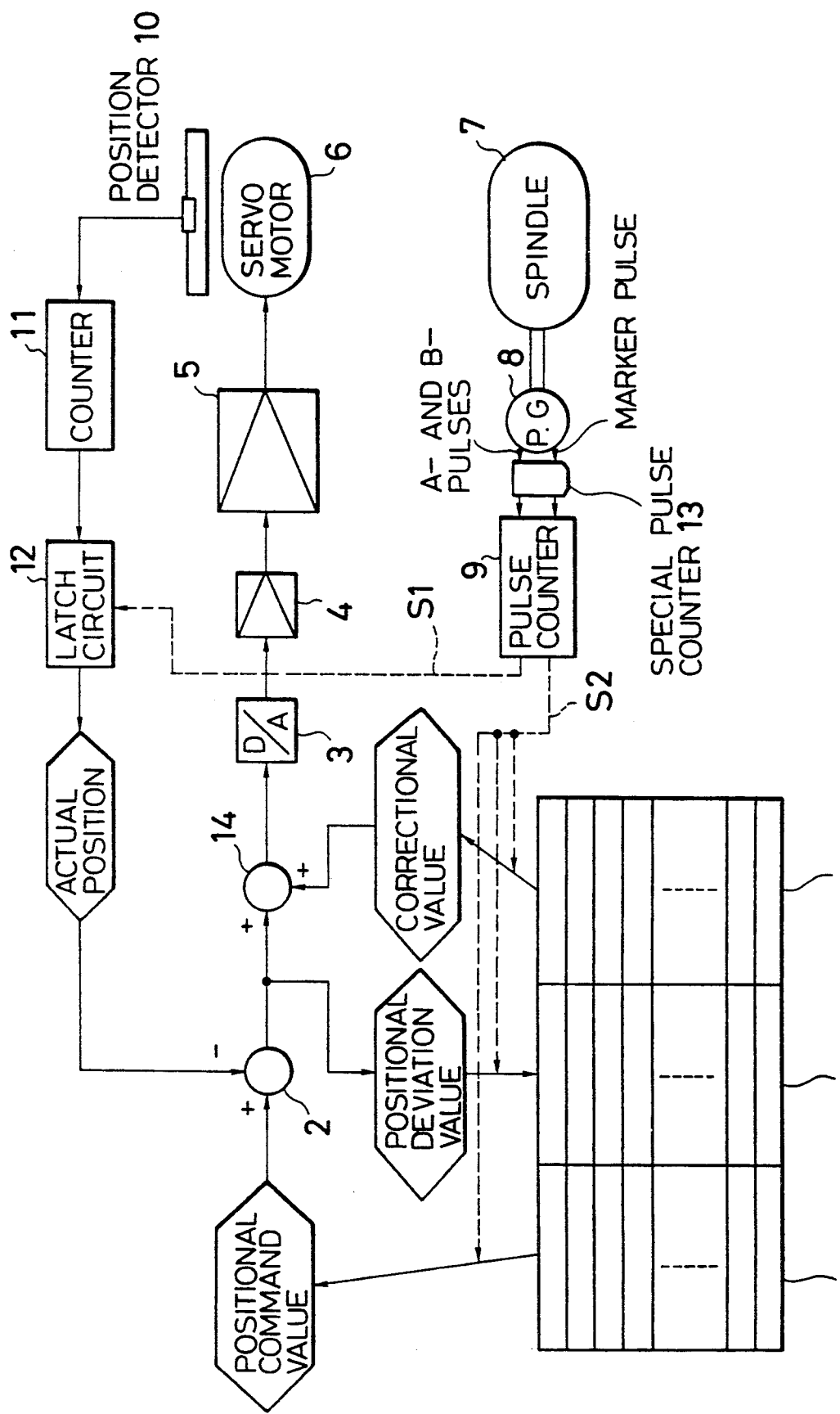
FIG. 7 is a block diagram to show another embodiment of the present invention.
Figure 8:
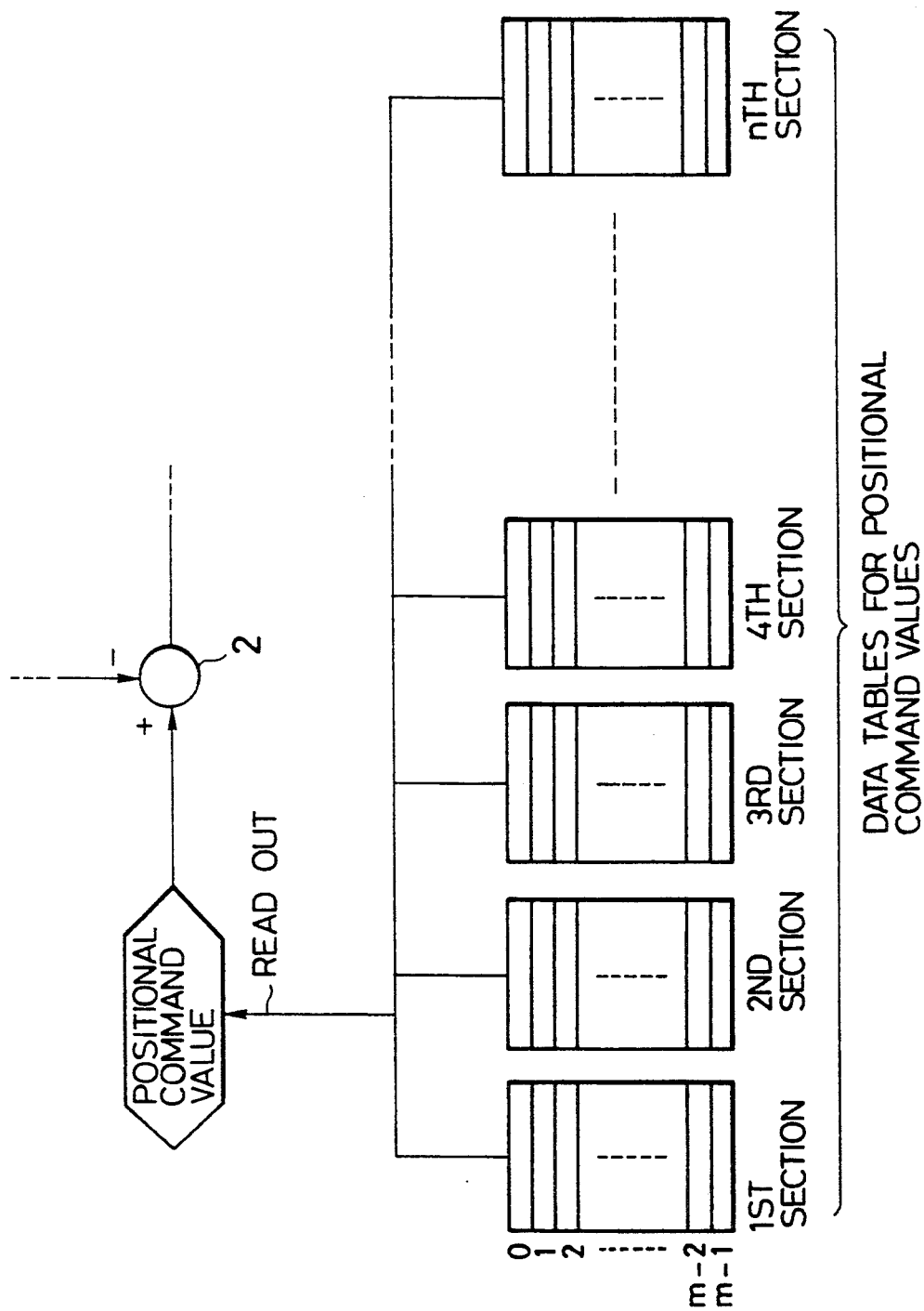
FIG. 8 is a view to show an embodiment having data table for positional command values corresponding to the plural rotations of the spindle.

In the embodiment mentioned above, the positional command value data alone are handled. But as shown in FIG. 7, the apparatus according to this invention is applicable to the numerical control system having a data table 16 for correctional value and a data table 15 for positional deviation value. But the data tables 1, the data tables 16 and 15 contain data not necessarily limited to those corresponding to one rotation of the spindle. In other words, the number of the data tables for positional command values in FIG. 8 is assumed to be n, and the data tables are denoted as the first, the second, . . . , the nth sections for convenience's sake, and the number within the section is represented as 0, 1, 2 . . . , (m−1). Everytime a spindle marker pulse is generated, data from the top end of the subsequent data table section is read out. As in the conventional case where the same data is repeatedly used if there is only one section, the nth section is followed by the first section in data reading. The same operation is applicable to the data table 16 for correctional value and the data table 15 for positional deviation values. When at least two types of shapes of the same phase angles and different amplitudes are to be continuously machined as shown in the graph 9B, it is possible to prevent gaps from being generated simply by generating marker pulses with a suitable delay.

As described in the foregoing statement, according to the present invention numerical control system, when a work to be machined has already been machined in the preceding step, and the rotational angle position has already been determined, by the time the work is attached at a chuck of the spindle, the rotational angle position can be changed easily even if the apparatus includes data tables for plural rotations without re-making the data table by shifting the data in the positional command value data table. Even if the starting points of command shapes are continuously changed during operation, the apparatus can process the work at a high rotational speed. Moreover, when at least two forms having the same phase angles and different amplitudes are to be continuously processed, gaps are prevented from being generated to enable smooth and effective turning operations. The system therefore does not apply excessive loads on the control system of the feed axis or vibration and shock on the driving mechanism. The apparatus as a whole becomes universal and highly efficient to facilitate turning operations.

It should be understood that many modifications and adaptations of the invention will become apparent to those skilled in the art and it is intended to encompass such obvious modifications and changes in the scope of the claims appended hereto.

What is claimed is:

1. A numerical control system comprising:
    data tables for storing position command information of a feed axis in correspondence with a rotational angle of a spindle of a numerically controlled machine and tool, said system controls the rotational angle of said spindle in synchronism with the position of said feed axis based on the pulses of a marker phase and of A- and B-phases from a spindle pulse generator which is connected to said spindle;
    a memory means for storing set values;
    a counting means for counting the pulses of the A- and B-phases from said spindle pulse generator and for clearing the counted value with the pulse of the marker phase;
    a marker pulse generating means for generating marker pulses when the values counted by said counting means has reached a set value stored in said memory means; and
    switching means for switching the pulses in the marker phase from said spindle pulse generator to the marker pulses from said marker pulse generating means at the time of synchronized operation based on the marker pulses from said marker pulse generating means and the content of said data tables.

2. A numerical control system according to claim 1, wherein said data tables comprise positional command values.

3. A numerical control system according to claim 2, wherein said data tables respectively have nth sections so that everytime said pulse of the marker phase is generated, data from a top end of subsequent data table section is read out.

4. A numerical control system according to claim 1, wherein said data tables comprise data table for positional command values, data table for positional; deviation values and data table for correctional values.

5. A numerical control system according to claim 4, wherein the output from said data table for correctional values is added to a deviation between said positional command value and an actual position value.

* * * * *